(12) United States Patent
Ko (10) Patent No.: US 12,151,637 B2
(45) Date of Patent: Nov. 26, 2024

(54) SEAT CUSHION AIRBAG AND FOLDING METHOD THEREOF

(71) Applicant: HYUNDAI MOBIS CO., LTD., Seoul (KR)

(72) Inventor: Seok Hoon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/349,212

(22) Filed: Jul. 10, 2023

(65) Prior Publication Data

US 2024/0116470 A1  Apr. 11, 2024

(30) Foreign Application Priority Data

Oct. 11, 2022 (KR) .................. 10-2022-0129844

(51) Int. Cl.
*B60R 21/237* (2006.01)
*B60R 21/201* (2011.01)
*B60R 21/207* (2006.01)
*B60R 21/239* (2006.01)

(52) U.S. Cl.
CPC .......... *B60R 21/207* (2013.01); *B60R 21/201* (2013.01); *B60R 21/237* (2013.01); *B60R 21/239* (2013.01)

(58) Field of Classification Search
CPC ... B60R 21/237; B60R 21/207; B60R 21/201; B60R 21/239; B60R 21/231; B60N 2/42763; B60N 2/42718; B60N 2/4263
USPC ...................................................... 280/730.1
See application file for complete search history.

(56) References Cited

U.S. PATENT DOCUMENTS

| | | | |
|---|---|---|---|
| 2006/0017266 A1* | 1/2006 | Yoshikawa | B60R 21/207 280/748 |
| 2006/0175880 A1* | 8/2006 | Hiruta | B60R 21/207 297/216.1 |
| 2007/0132213 A1* | 6/2007 | Suzuki | B60R 21/207 280/801.1 |
| 2007/0132214 A1* | 6/2007 | Suzuki | B60N 2/42718 280/801.1 |
| 2013/0082457 A1* | 4/2013 | Hashido | B60N 2/42718 280/730.1 |
| 2014/0291973 A1* | 10/2014 | Nukaya | B60R 21/201 280/730.1 |
| 2020/0391686 A1* | 12/2020 | Ohno | B60N 2/62 |
| 2022/0176905 A1* | 6/2022 | Ishigaki | B60N 2/42718 |
| 2023/0131869 A1* | 4/2023 | Ishigaki | B60R 21/26 280/730.1 |

(Continued)

FOREIGN PATENT DOCUMENTS

| | | | |
|---|---|---|---|
| JP | 2005306252 A | * | 11/2005 |
| JP | 2006143002 A | * | 6/2006 |
| JP | 2007126117 A | * | 5/2007 |

(Continued)

*Primary Examiner* — Keith J Frisby
(74) *Attorney, Agent, or Firm* — NovoTechIP International PLLC (57) ABSTRACT

The present disclosure relates to a seat cushion airbag and a folding method of the seat cushion airbag that can be installed in a reduced package while protecting a wide area when deployed and discloses a seat cushion airbag and a method of folding the seat cushion airbag that is stowed in a folded state in the seat cushion but a portion of which is pushed inward.

12 Claims, 13 Drawing Sheets

(56) References Cited

U.S. PATENT DOCUMENTS

2023/0256928 A1\*   8/2023   Ishigaki ............. B60N 2/42763
                                                                 280/728.2
2024/0001881 A1\*   1/2024   Ishigaki ............. B60N 2/42718

FOREIGN PATENT DOCUMENTS

| JP | 2007153029 A | \* | 6/2007 | |
|----|---|---|---|---|
| JP | 5261925 B2 | \* | 8/2013 | |
| JP | 2019123278 A | \* | 7/2019 | |
| KR | 10-2022-0072970 A | | 6/2022 | |
| WO | WO-2006003749 A1 | \* | 1/2006 | ......... B60N 2/42763 |

\* cited by examiner

SEAT CUSHION AIRBAG AND FOLDING METHOD THEREOF

CROSS-REFERENCE TO RELATED APPLICATIONS

The present application claims priority to Korean Patent Application No. 10-2022-0129844, filed on Oct. 11, 2022, the entire contents of which is incorporated herein for all purposes by this reference.

TECHNICAL FIELD

The present disclosure relates to a seat cushion airbag and a folding method of the seat cushion airbag that can be installed in a reduced package while protecting a wide area when deployed.

BACKGROUND

A seat cushion airbag is installed in a seat cushion of a vehicle.

The seat cushion airbag deploys to lift a passenger's thighs and thus reduces the passenger's forward movement in the event of an accident.

In addition, lifting the passenger's thighs helps alleviate a submarine phenomenon caused by the passenger's lower body slipping under the lap belt.

In particular, the widespread use of a relaxation comfort seat that significantly reclines the seatback further increases the possibility of the submarine phenomenon. Thus, the importance of seat cushion airbags is ever increasing.

On the other hand, various structures such as a blower for ventilation and an air bladder for massage in addition to the seat cushion airbag are arranged in the seat cushion.

However, there is a problem that the unique ventilation and massage function of the blower and air bladder cannot work properly if the blower or air bladder overlaps with the cushion of the seat cushion airbag.

Therefore, other structures may be installed by reducing the installation space for the seat cushion airbag. However, this presents a problem in that the size of the cushion cannot be excessively reduced to ensure passenger protection.

The matters described above as background technology are intended to provide a better understanding of the background of the present disclosure and should not be considered as acknowledging that the present disclosure pertains to the prior art already known to those skilled in the art.

SUMMARY

The present disclosure is devised to address the issues described above and aims to provide a seat cushion airbag and a folding method of the seat cushion airbag that can be installed in a reduced package while protecting a wide area when deployed.

The seat cushion airbag of the present disclosure for achieving the object as described above may include an airbag cushion that is stowed in a folded state in a seat cushion but a portion of which is pushed inward in the seat cushion.

One end of the airbag cushion may be pushed inward toward the opposite end.

A portion of the airbag cushion may be pushed inward in the front and rear longitudinal direction.

The rear portion of the airbag cushion may be pushed inward toward the front.

Gas may be injected from the opposite side of the inward-pushed portion of the airbag cushion.

The portion of the airbag cushion which is folded to overlap may be temporarily fixed by a temporary fixing structure such that the temporary fixing structure breaks off when the airbag cushion deploys.

The temporary fixing structure may be formed in a plurality of rows side by side.

The temporary fixing structures may be formed irregularly at a plurality of temporary fixing positions.

A vent hole may be formed in a folded portion of the airbag cushion.

A plate-shaped seat panel may be provided in the seat cushion and the vent hole may be formed in the airbag cushion in contact with the seat panel.

The portion of the airbag cushion overlapping around the vent hole may be temporarily fixed by the temporary fixing structure so that the temporary fixing structure breaks off when the airbag cushion deploys.

A plurality of temporary fixing structures may be fixed and may respectively break off at different times.

A folding method of the seat cushion airbag includes pushing a portion of the airbag cushion inward in the seat cushion.

According to the present disclosure for resolving the issues described above, the airbag cushion is installed in a package reduced by as much as the area of the inward-pushed portion of the airbag cushion when the airbag cushion is folded and the folded portion unfolds when the airbag cushion deploys, thereby having the effect of protecting passengers in a wide area.

In addition, applying a temporary fixing structure and vent hole to the folded portion of the airbag cushion has the advantage of not only lifting the passenger's thigh more quickly but also controlling the timing of full deployment of the airbag cushion by optimizing the venting timing in the airbag cushion.

In one example, the following description will describe a seat cushion airbag configured to reside in a seat cushion and to, in an automobile accident, expand vertically to raise thighs of a seated passenger to prevent a submarine phenomenon in which the passenger slips under a lap belt. The seat cushion airbag including: an airbag cushion configured to receive pressurized gas and expand in volume in response to an automobile accident; an inlet to admit the pressurized gas into the airbag cushion; and a concave fold in the airbag cushion in which a side portion of the airbag cushion is displaced toward an interior of the airbag cushion such that two exterior portions of the airbag cushion overlap and oppose each other across the fold. Upon receipt of the pressurized gas, the fold is unfolded as a height of the airbag cushion expands to lift the passenger.

In various examples, the concave fold includes one end of the airbag cushion being pushed inward toward an opposite end. More specifically, the concave fold may include a rear portion of the airbag cushion being displaced toward a front portion of the airbag cushion. The inlet may be disposed on an opposite side of the airbag cushion from the concave fold. The inlet may be located in a front portion of the airbag cushion toward knees of the passenger when seated.

In another aspect, the following description will explain a method of preparing a seat cushion airbag to reside in a seat cushion and to, in an automobile accident, expand vertically to raise thighs of a seated passenger to prevent a submarine phenomenon in which the passenger slips under a lap belt. For example, the method includes: providing an airbag cushion configured to receive pressurized gas and expand in volume in response to an automobile accident with an inlet to admit the pressurized gas into the airbag cushion; and forming a concave fold in the airbag cushion in which a side portion of the airbag cushion is displaced toward an interior of the airbag cushion such that two exterior portions of the airbag cushion overlap and oppose each other across the fold. Upon receipt of the pressurized gas, the fold is unfolded as a height of the airbag cushion expands to lift the passenger.

In another aspect, the following description will describe a seat cushion for an automobile that includes: a seat cushion frame; an inflator; and a seat cushion airbag configured to reside in the seat cushion and to, in an automobile accident, expand vertically to raise thighs of a seated passenger to prevent a submarine phenomenon in which the passenger slips under a lap belt. In this example, the seat cushion airbag includes: an airbag cushion configured to receive pressurized gas and expand in volume in response to an automobile accident, an inlet to admit the pressurized gas into the airbag cushion, and a concave fold in the bag in which a side portion of the bag is displaced toward an interior of the bag such that two exterior portions of the bag oppose each other across the fold. Upon receipt of the pressurized gas, the fold is unfolded as a height of the airbag cushion expands to lift the passenger.

DETAILED DESCRIPTION

The embodiments disclosed herein will be described in detail with reference to the accompanying drawings. However, the same or similar components will be given the same reference numerals regardless of the drawing numbers, and the repetitive descriptions regarding these components will be omitted.

The suffixes "module" and "unit" for the components used in the following description are given or interchangeably used only to facilitate the writing of the specification, without necessarily indicating a distinct meaning or role of their own.

When it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein, are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

Figure 1:
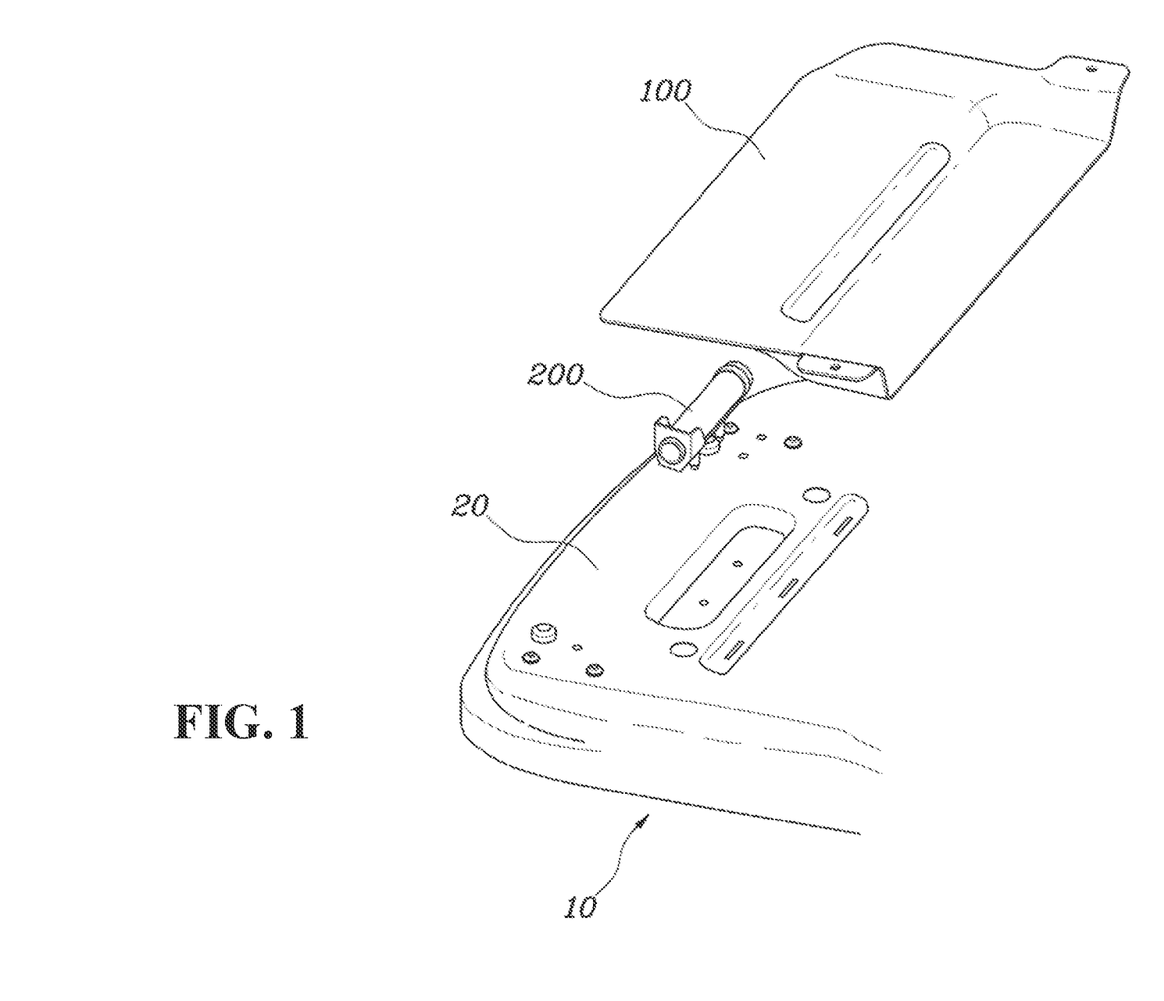
FIG. 1 is a view showing detached components of a seat cushion airbag according to the present disclosure.
Figure 2:
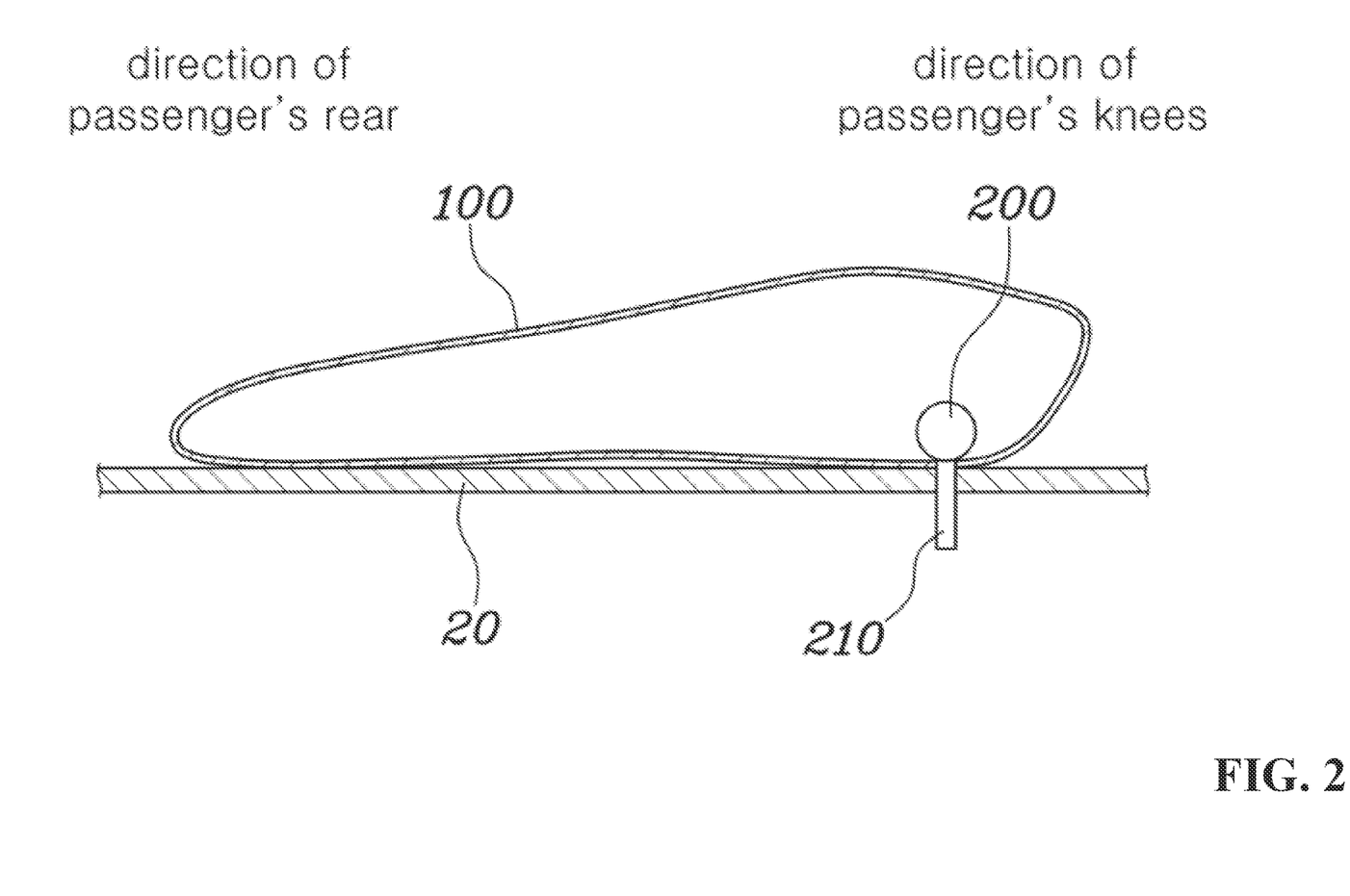
FIG. 2 is a schematic view of an airbag cushion in a deploying state according to the present disclosure.

FIG. 1 is a view showing detached components of a seat cushion airbag according to the present disclosure, and FIG. 2 is a schematic view of an airbag cushion 100 in a deployed state according to the present disclosure.

The drawings show that, according to the present disclosure, a seat cushion frame is formed inside a seat cushion 10, and a plate-shaped seat panel 20 is formed at the front end of the seat cushion frame.

The airbag cushion 100 of the seat cushion airbag is stowed on top of the seat panel 20 in a folded state, and an inflator 200 is inserted into the airbag cushion 100 so that gas exploding in the inflator 200 is injected into the airbag cushion 100.

In addition, a stud 210 fixed to the inflator 200 may be coupled to the seat panel 20 to couple the inflator 200 thereto, or a retainer connected to the inflator 200 may be provided with the stud 210 and the stud 210 is coupled to the seat panel 20 to couple the inflator 200 thereto.

Figure 3:
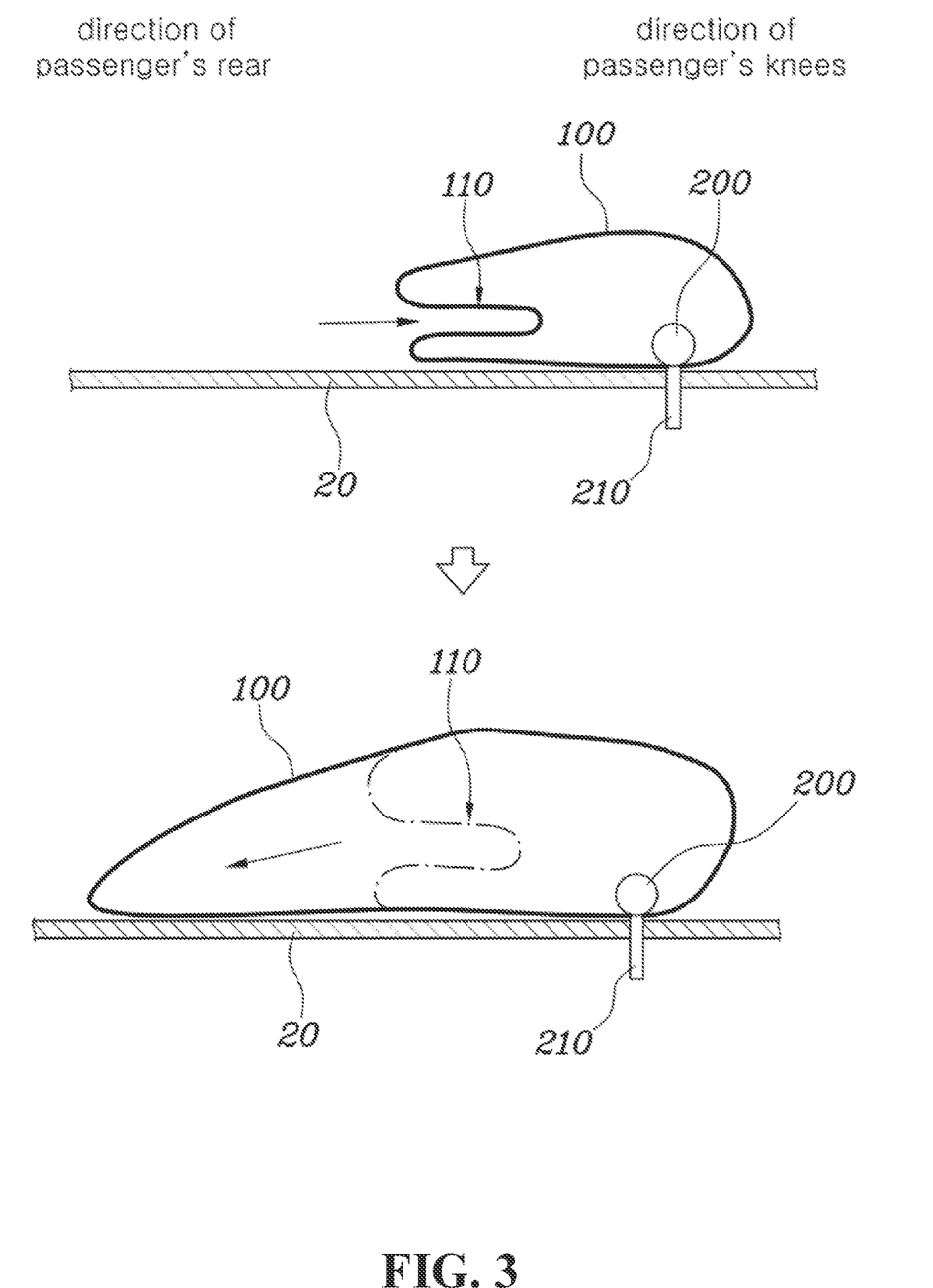
FIGS. 3 and 4 are views showing a deploying operation of an airbag cushion in a state where the airbag cushion is pushed inward to be folded according to the present disclosure.
Figure 4:
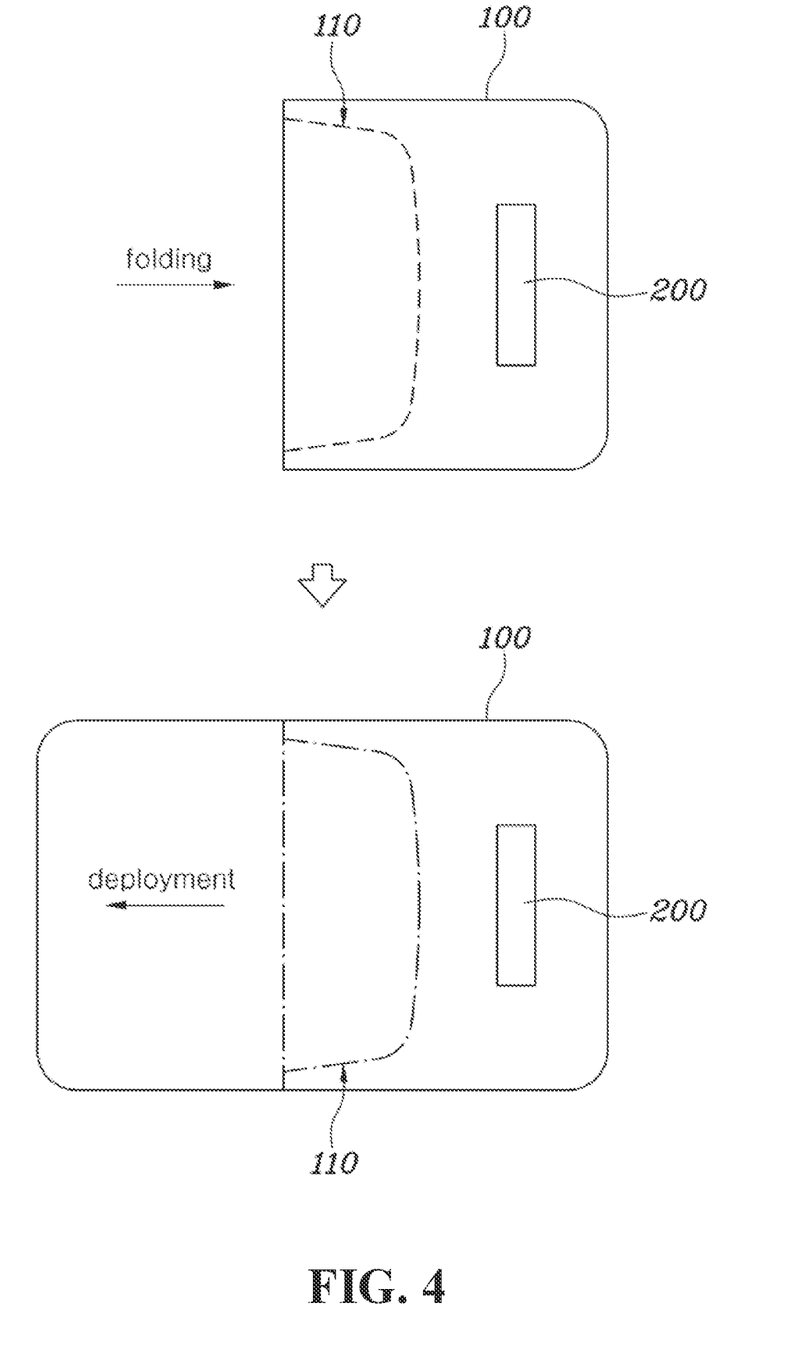

FIGS. 3 and 4 are views showing a deploying operation of the airbag cushion 100 in a state where the airbag cushion 100 is pushed inward.

The drawings show that the seat cushion airbag of the present disclosure includes the airbag cushion 100 that is stowed in a folded state in the seat cushion 10 where a part of the airbag cushion 100 is pushed inward.

For example, the airbag cushion 100 is folded in a shape in which the upper surface and the lower surface overlap. A portion of the airbag cushion 100 is pushed into an inner space between the upper surface and the lower surface in a tuck-in form once or more so that the folded portion 110 overlaps the upper surface and the lower surface.

Accordingly, when the airbag cushion 100 is folded, the size of the stowed airbag cushion 100 is reduced by as much as the area of the folded portion 110 overlapping the upper surface and the lower surface so that the airbag cushion 100 is installed in a reduced package, and when the airbag cushion 100 deploys, the folded portion unfolds to protect a wide area.

As shown in FIG. 3, one end of the airbag cushion 100 may preferably be pushed inward toward the opposite end.

That is, the size of the stowed airbag cushion 100 can be reduced as much as possible by pushing one end where the upper end and the lower end border, rather than a middle portion of the upper end or the lower end, toward the opposite end.

In addition, a portion of the airbag cushion 100 is pushed inward in the front and rear longitudinal direction.

That is, the airbag cushion 100 is folded in the front portion of the seat cushion 10 and a structure such as a blower or an air bladder is disposed in the rear portion of the seat cushion 10 so that the airbag cushion 100 cannot be stowed in the area where the blower or air bladder is installed.

Accordingly, the length of the airbag cushion 100 in the front and rear longitudinal direction can be reduced by folding the airbag cushion 100 so that the airbag cushion 100 can be stowed without interference from the blower or air bladder.

Further, the rear portion of the airbag cushion 100 may be pushed inward toward the front.

Further, gas may be injected from the opposite side of the folded portion of the airbag cushion 100.

For example, the rear portion of the airbag cushion 100 that faces the direction of the passenger's rear is folded, and the inflator 200 is connected to the front portion of the airbag cushion 100 that faces the direction of the passenger's knees.

Accordingly, when gas is supplied through the inflator 200, the front portion of the airbag cushion 100 starts to be filled by the gas pressure of the inflator 200, quickly lifting the passenger's thighs close to the knees, and then the rear portion of the airbag cushion 100 is filled with the gas flowing rearward, unfolding the folded portion 110 to the rear, thereby fully deploying the airbag cushion 100.

Figure 5:
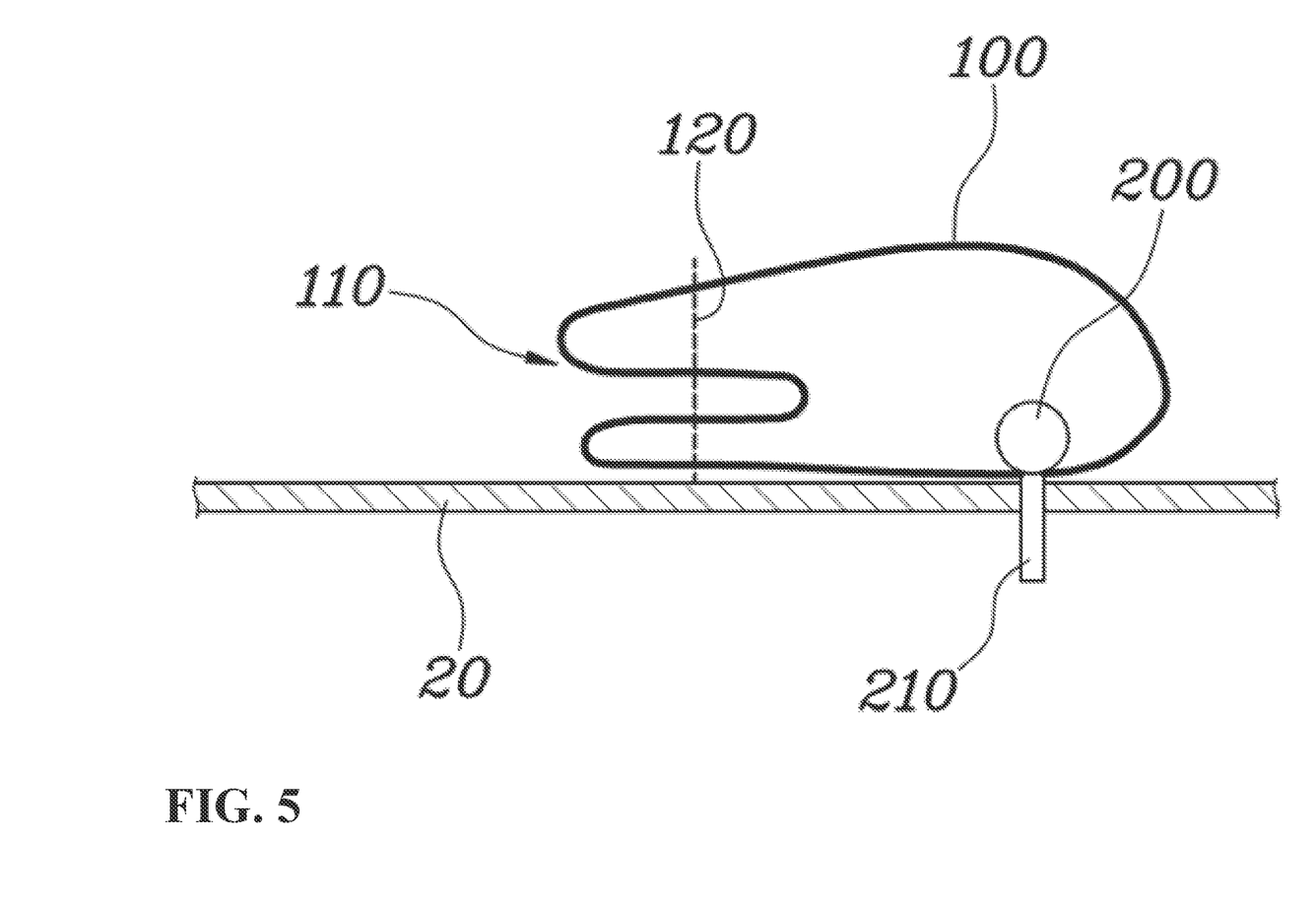
FIGS. 5 and 6 are views showing a temporary fixing structure reflected in a folded portion of an airbag cushion according to the present disclosure.
Figure 6:
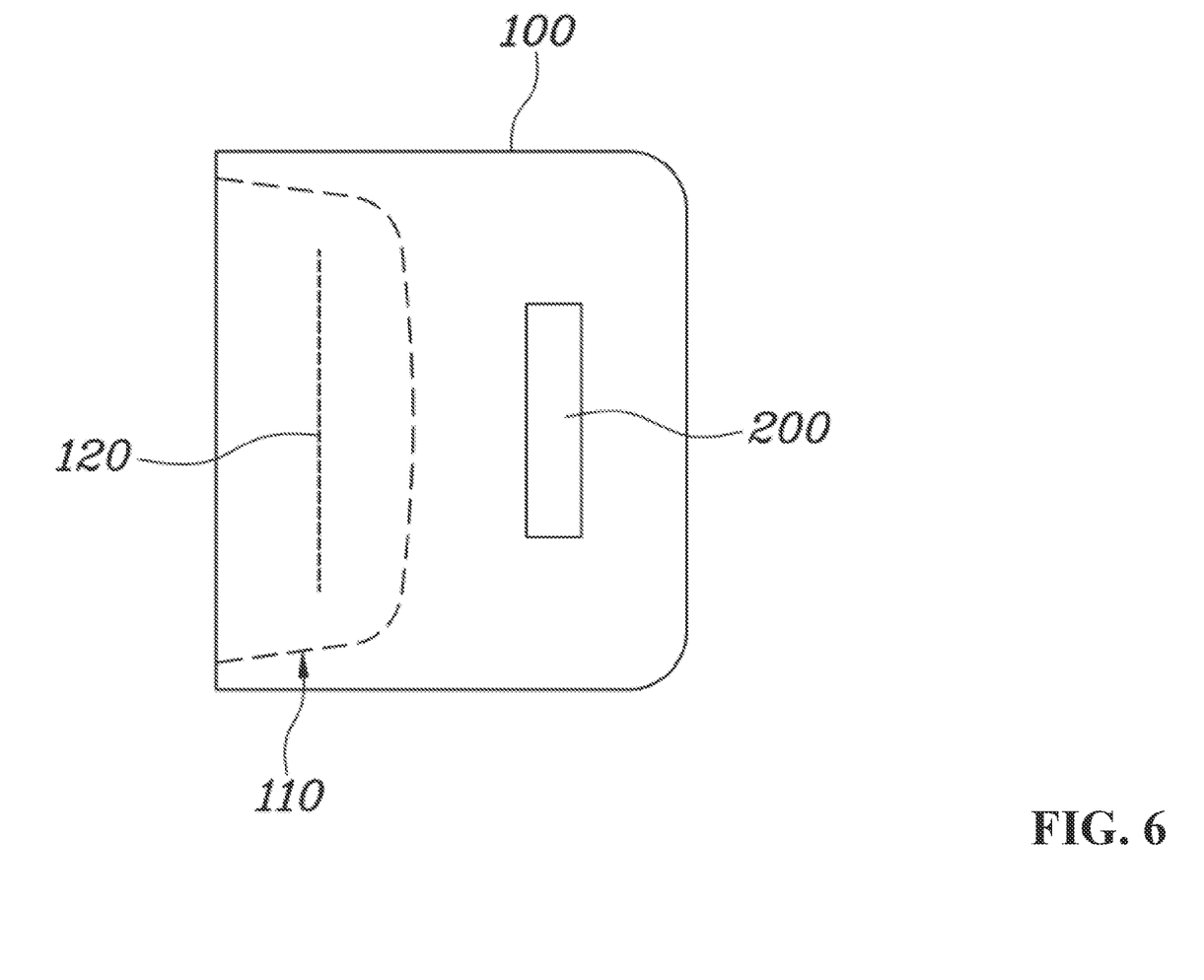

FIGS. 5 and 6 are views showing a temporary fixing structure 120 reflected in the folded portion of the airbag cushion 100 according to the present disclosure.

The drawings show that the overlapping folded portion of the airbag cushion 100 may be configured to be temporarily fixed by the temporary fixing structure 120 such that the temporary fixing structure 120 breaks off when the airbag cushion 100 deploys.

Here, the temporary fixing structure 120 may be a structure fixed with a thin thread or a thread of low strength.

The temporary fixing structure 120 may delay the deployment timing of the folded portion 110 compared to the deployment timing of the airbag cushion 100 without the temporary fixing structure 120.

Accordingly, the remaining portion of airbag cushion 100 other than the folded portion 110 deploys more quickly so that the passenger's thighs are lifted quickly, thereby reliably alleviating the submarine phenomenon that may occur in the event of an accident.

Figure 7:
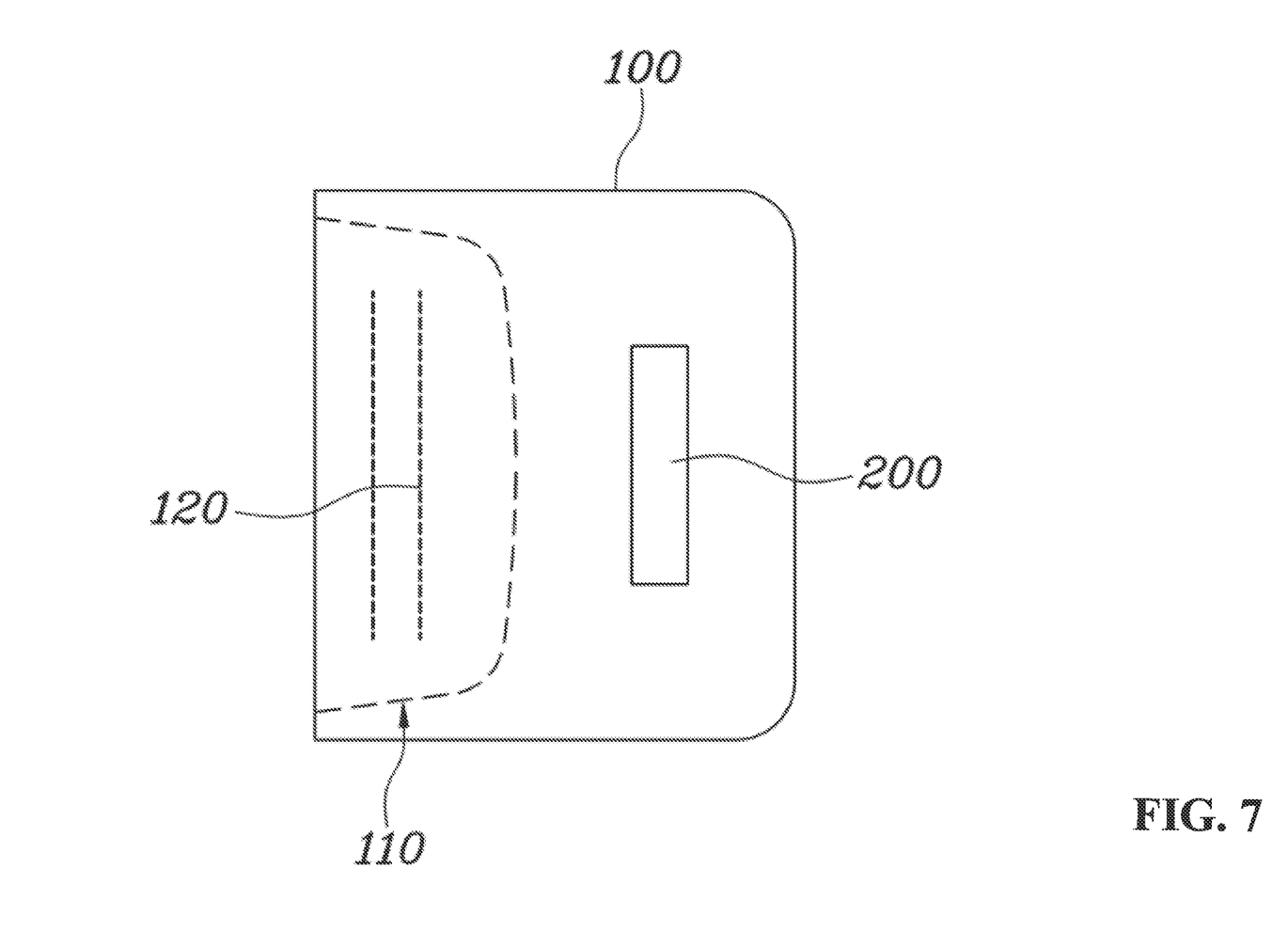
FIGS. 7 and 8 are views showing other embodiments of the temporary fixing structure shown in FIG. 6.
Figure 8:
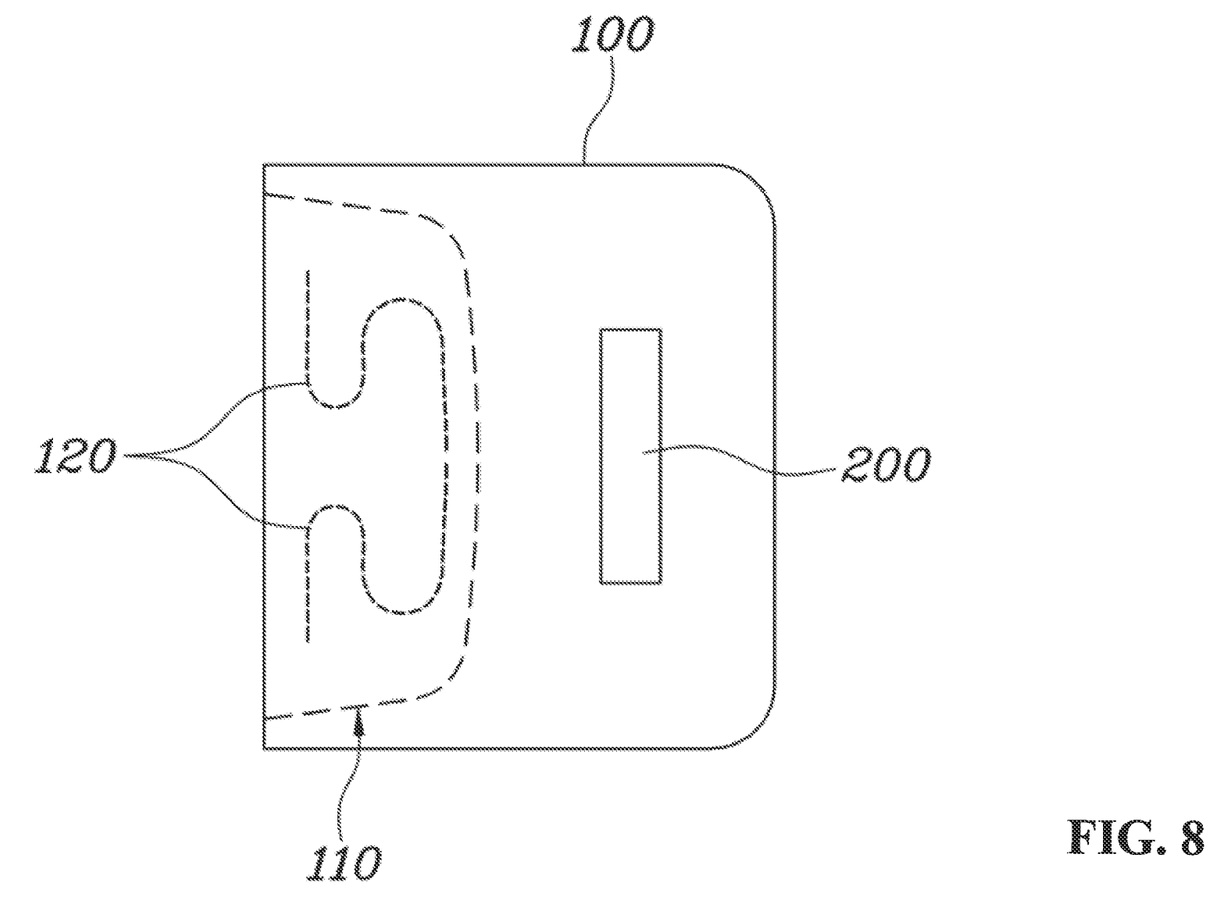

FIGS. 7 and 8 are views showing additional embodiments of the temporary fixing structure 120 shown in FIG. 6, and the temporary fixing structure 120 shown in FIGS. 7 and 8 are structures of the embodiments having a strengthened fixing force of the temporary fixing compared to the temporary fixing structure 120 shown in FIG. 6.

First, the temporary fixing structure 120 shown in FIG. 7 may be formed in a plurality of rows side by side.

That is, the fixing force of the temporary fixing structure 120 is strengthened by a pair of stitch lines side by side.

In addition, as shown in FIG. 8, a plurality of temporary fixing structures 120 may be formed irregularly at the temporary fixing position.

That is, the fixing force of the temporary fixing structure 120 is strengthened by sewing the folded portion 110 irregularly and intricately with no specific orientation of stitch lines.

Such temporary fixing structure 120 strengthens the fixing force of the temporary fixing compared to the temporary fixing structure 120 shown in FIG. 6, thereby allowing a further delay in the deployment timing of the folded portion 110 of the airbag cushion 100.

Figure 9:
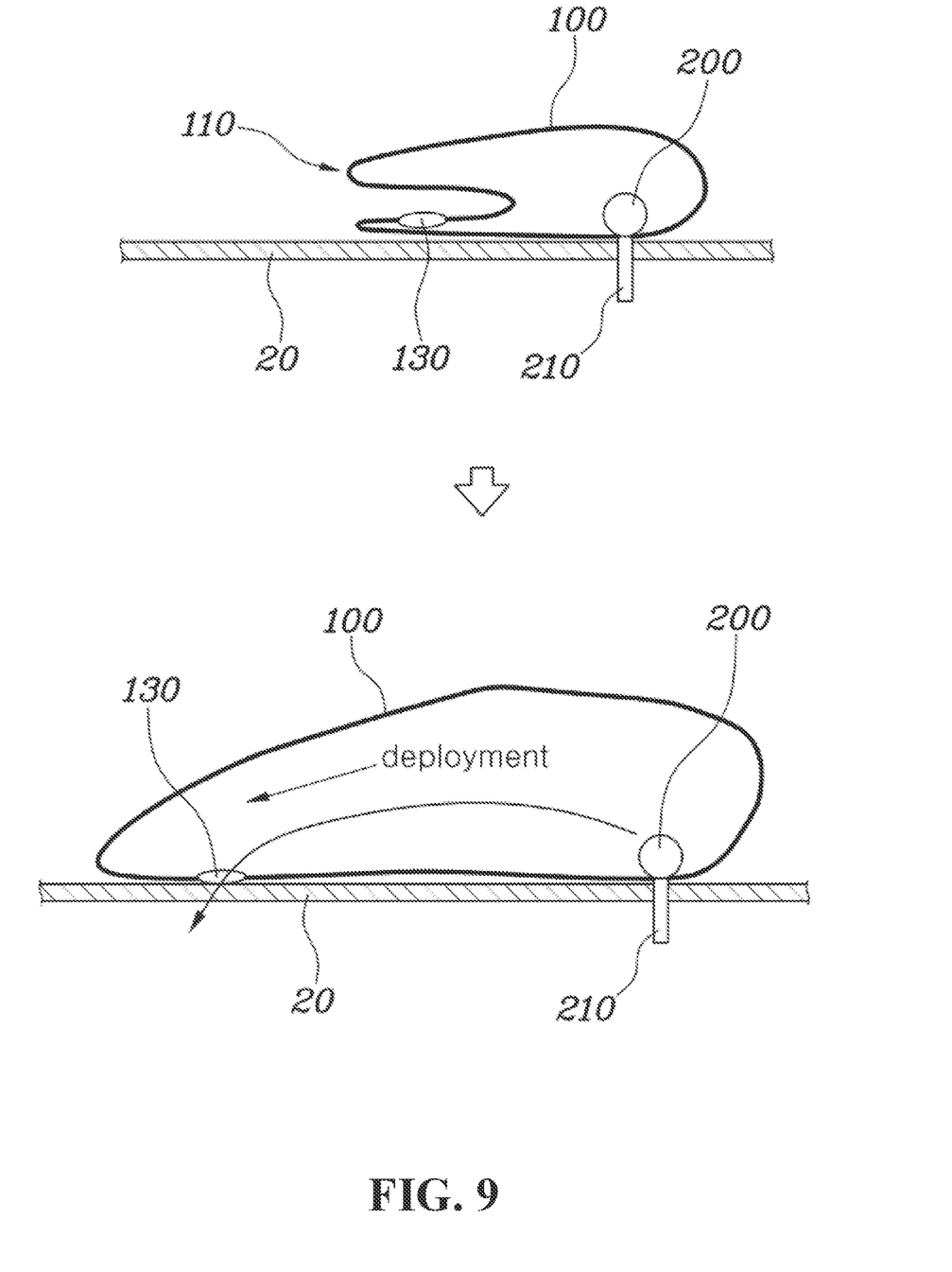
FIGS. 9 and 10 are views showing a deploying operation of an airbag cushion in a state where the airbag cushion with a vent hole formed therein is pushed inward to be folded according to the present disclosure.
Figure 10:
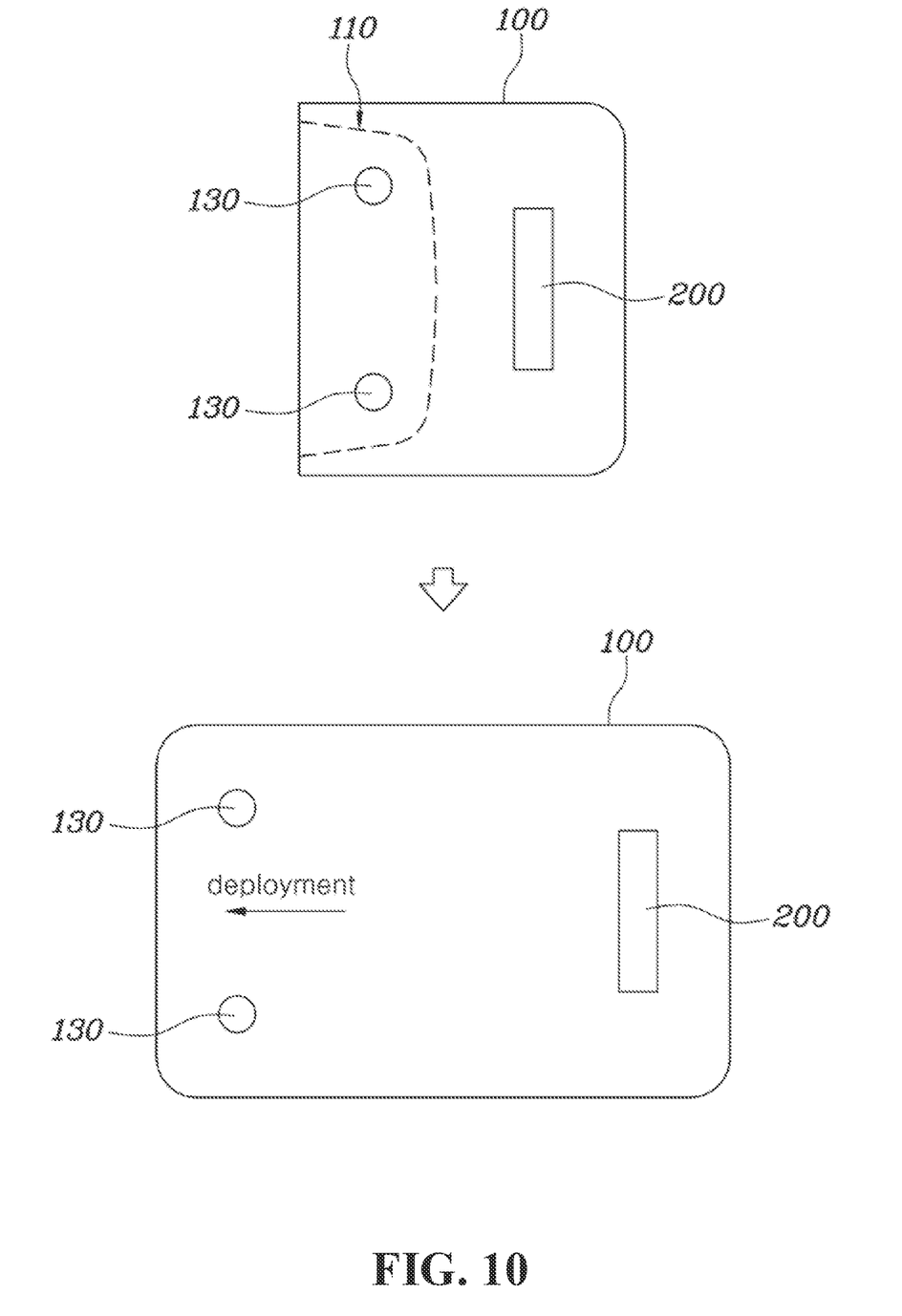

FIGS. 9 and 10 are views showing a deploying operation of an airbag cushion 100 in a state where the airbag cushion with a vent hole 130 formed therein is pushed inward according to the present disclosure.

The drawings show that the vent hole 130 may be formed in the folded portion 110 of the airbag cushion 100. One or more vent holes 130 may be formed.

That is, the vent hole 130 is formed in the folded portion 110 so that the venting operation of the gas through the vent hole 130 is delayed until the folded portion 110 in the rear of the airbag cushion 100 unfolds, thereby allowing the quick lifting of the passenger's thighs.

Further, a plate-shaped seat panel 20 may be provided in the seat cushion 10, and a vent hole 130 may be formed in the airbag cushion 100 in contact with the seat panel 20.

Specifically, the airbag cushion 100 deploys on top of the seat panel 20, and the vent hole 130 is formed in the folded portion 110 in the rear that stretches to the lower surface of the airbag cushion 100.

Accordingly, when the airbag cushion 100 deploys, the vent hole 130 is positioned to be in contact with the seat panel 20 from above.

Accordingly, when the airbag cushion 100 deploys, the venting operation of gas through the vent hole 130 is delayed so that the internal pressure of the airbag cushion 100 gradually declines, thereby reducing the risk of an injury to the passenger caused by the submarine phenomenon.

Figure 11:
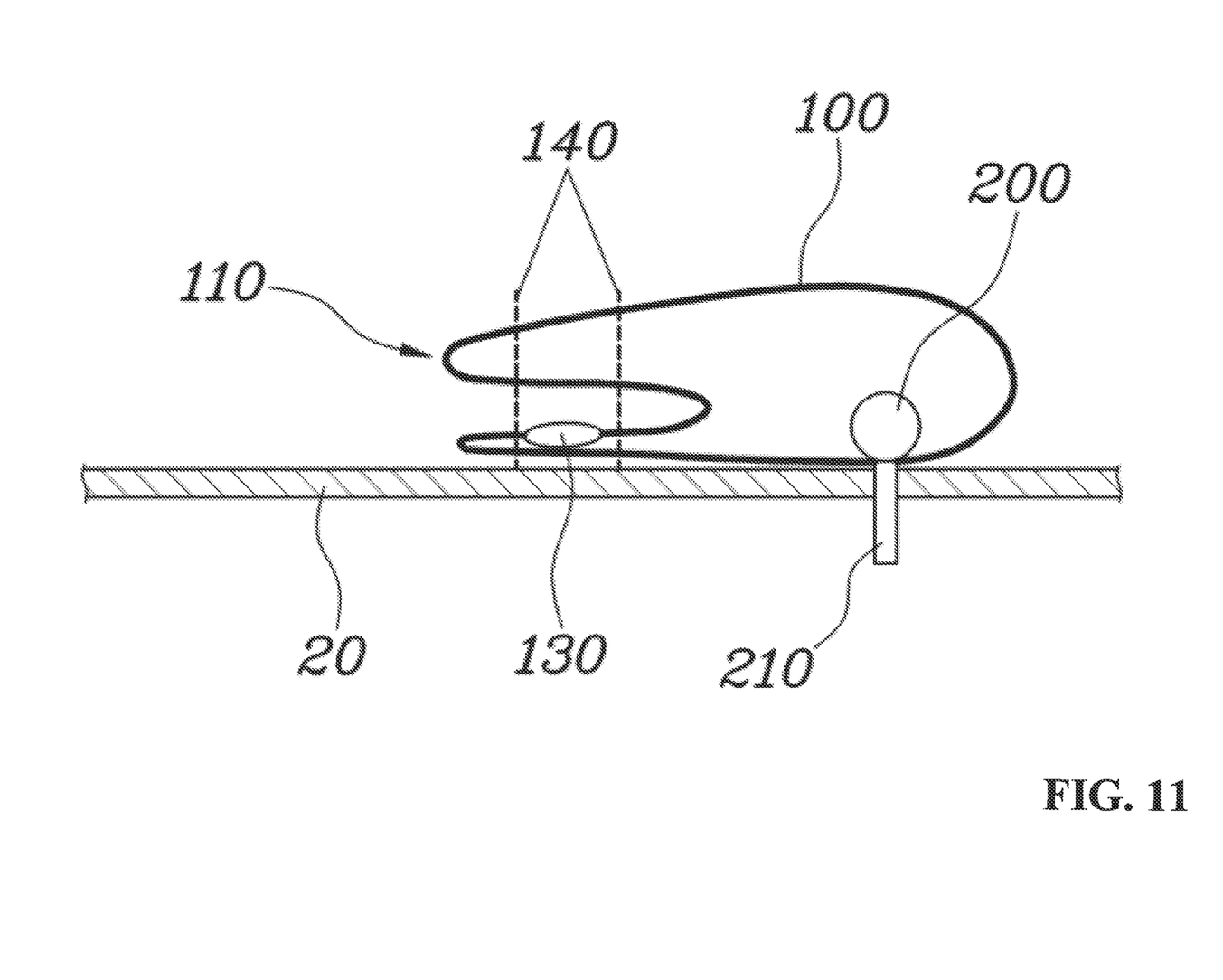
FIGS. 11 and 12 are views showing a temporary fixing structure reflected around a vent hole according to the present disclosure.
Figure 12:
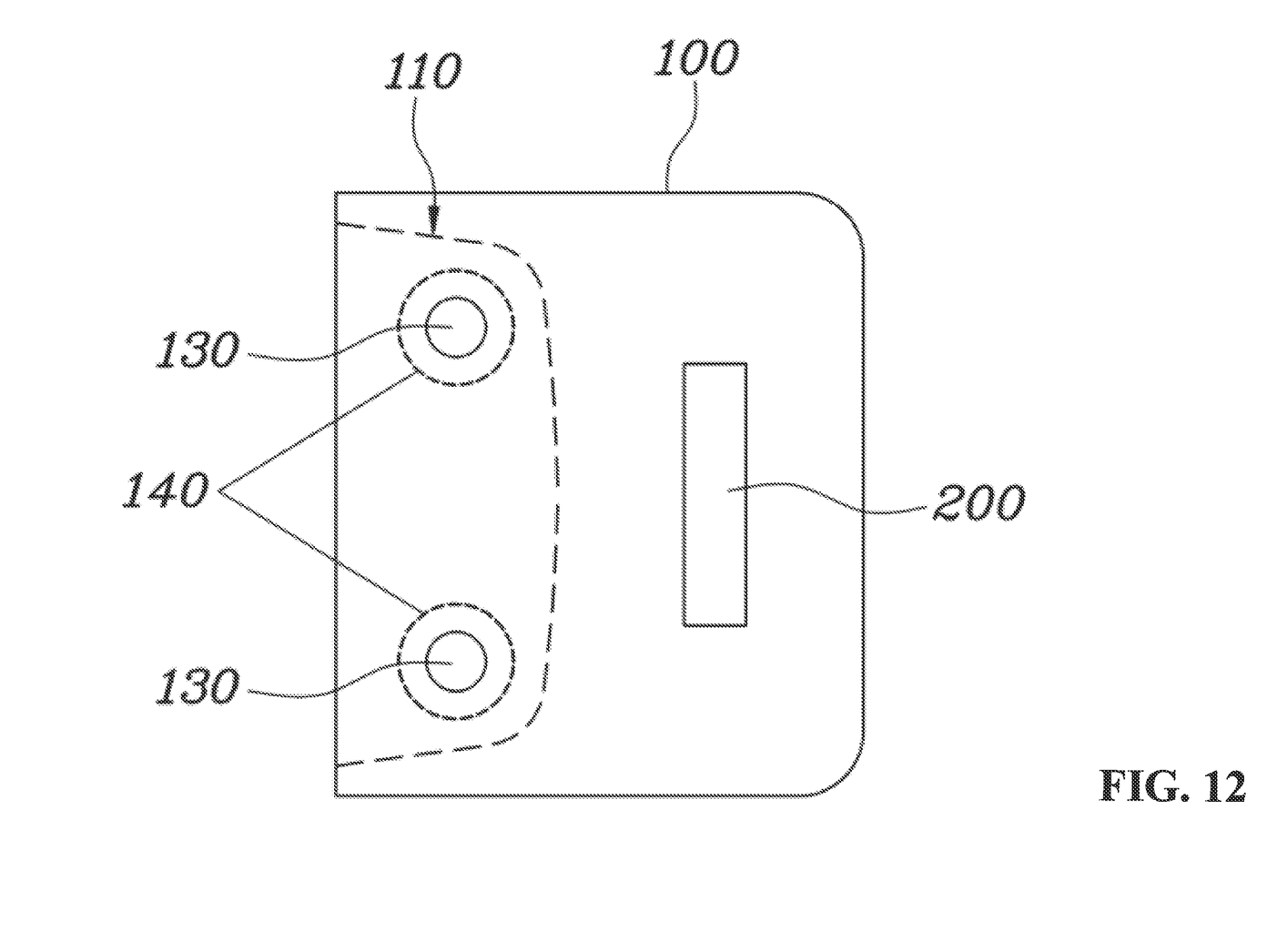

FIGS. 11 and 12 are views showing a temporary fixing structure 140 reflected around the vent hole 130 according to the present disclosure.

The drawings show that the overlapping portion of the airbag cushion 100 around the vent hole 130 may be configured to be temporarily fixed by the temporary fixing structure 140 such that the temporary fixing structure 140 breaks off when the airbag cushion 100 deploys.

Here, the temporary fixing structure 140 may be fixed by a thin thread or a thread of lesser strength and may be circularly sewn around the circular vent hole 130

By such a temporary fixing structure 140, the opening timing of the vent hole 130 may be delayed compared to the opening timing of the airbag cushion 100 without the temporary fixing structure 140.

Accordingly, the vent hole 130 is almost in a closed state until the temporary fixing structure 140 formed around the vent hole 130 breaks off, which delays the venting operation of gas through the vent hole 130, thereby allowing the quicker lifting of the passenger's thighs.

Figure 13:
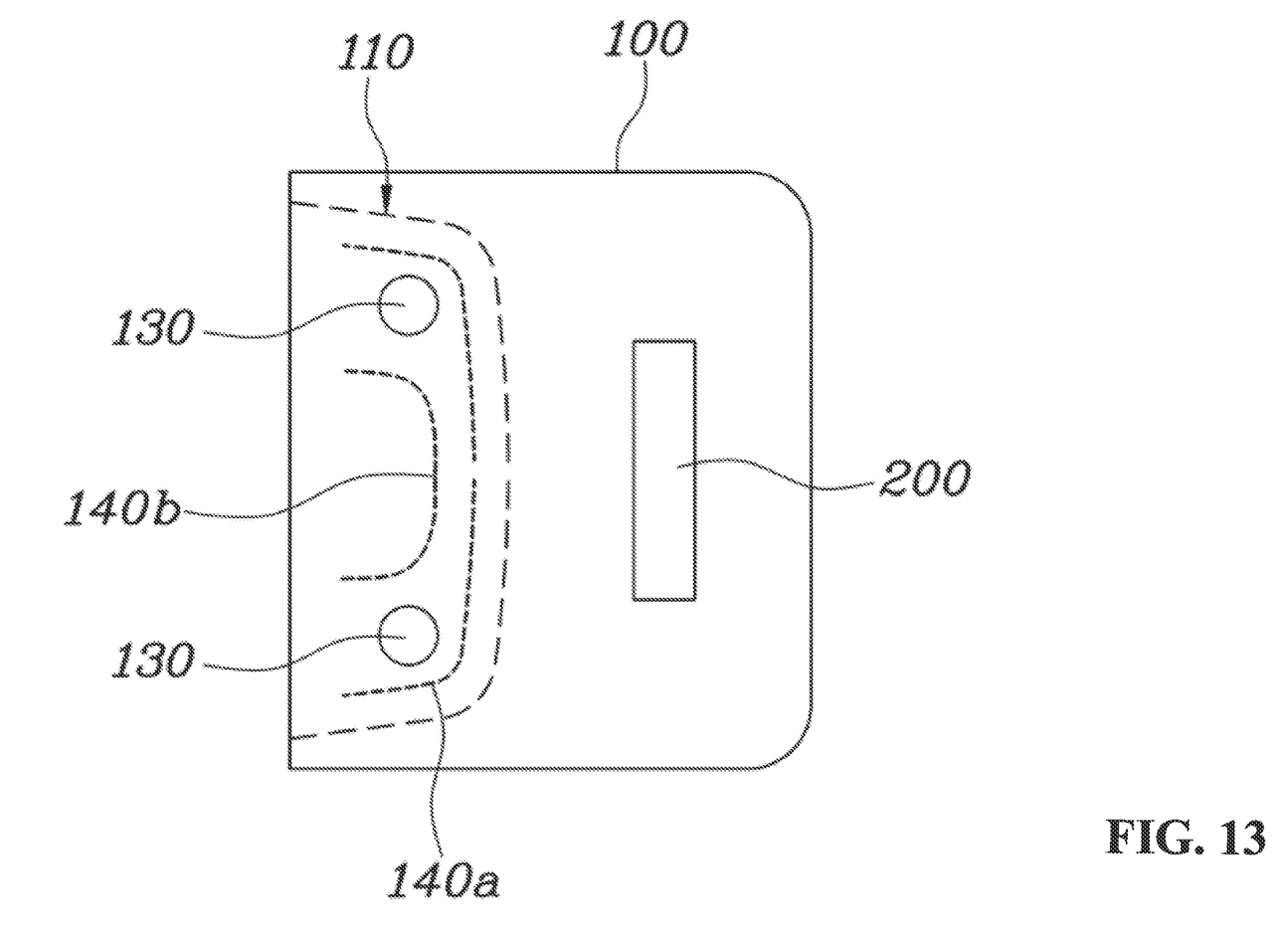
FIG. 13 is a view showing another embodiment of the temporary fixing structure shown in FIG. 12.

FIG. 13 is a view showing still another embodiment of the temporary fixing structure 140 shown in FIG. 12.

The drawing shows that a plurality of temporary fixing structures 140 may be fixed, and each temporary fixing structure 140 may have a different break-off time.

For example, a first temporary fixing portion 140a may be temporarily fixed in the direction of the passenger's thighs and a second temporary fixing portion 140b may be temporarily fixed in the direction of the passenger's rear.

In this case, the timing of when the vent hole 130 is exposed to the outside can be controlled by adjusting the fixing force of the first temporary fixing portion 140a and the second temporary fixing portion 140b such that the first temporary fixing portion 140a breaks off earlier than the second temporary fixing portion 140b in the deploying process of the airbag cushion 100.

On the other hand, a folding method of the seat cushion airbag of the present disclosure is pushing inward a portion of the airbag cushion 100 in the seat cushion 10.

Accordingly, as shown in FIG. 3, according to the present disclosure, when the airbag is activated, the front portion of the airbag cushion 100, to which the folded portion 110 is not applied, first starts to be filled by the gas pressure of the inflator 200, quickly lifting the passenger's thighs.

In addition, the folded portion 110 deploys rearward as the gas filling the front portion fills the folded portion 110, which is the rear portion of the airbag cushion 110, thereby fully deploying the airbag cushion 100.

In this manner, when the airbag cushion 100 is folded, the size of the stowed airbag cushion 100 is reduced by as much as the area of the inward-pushed folded portion so that the airbag cushion 100 is installed in a reduced package, and when the airbag cushion 100 deploys, the folded portion unfolds to protect a wide area.

In addition, by applying the temporary fixing structure (120, 140) and the vent hole 130 to the folded portion 110 of the airbag cushion 100, the passenger's thighs are lifted more quickly, and the timing of full deployment of the airbag cushion 100 is controlled by optimizing the venting timing in the airbag cushion 100.

While only specific embodiments of the present disclosure have been described above, it is obvious to those skilled in the art that various modifications and improvements can be made within the scope of the technical spirit of the present disclosure and that such modifications and improvements fall within the scope of the appended claims.

What is claimed is:

1. A seat cushion airbag configured to reside in a seat cushion and, upon an automobile accident, to expand vertically to raise thighs of a seated passenger to prevent a submarine phenomenon in which the passenger slips under a lap belt, the seat cushion airbag comprising:
    an airbag cushion configured to receive pressurized gas and expand in volume in response to an automobile accident;
    an inflator to admit the pressurized gas into the airbag cushion; and
    a concave fold in the airbag cushion in which a side portion of the airbag cushion is displaced toward an interior of the airbag cushion such that two exterior portions of the airbag cushion overlap with and oppose each other across the fold,
    wherein, upon receipt of the pressurized gas, the fold is unfolded as a height of the airbag cushion expands to lift thighs of a passenger if seated on the seat cushion airbag; and
    wherein the inflator is disposed at an unfolded side of the airbag cushion opposite from the concave fold;
    further comprising a circular vent hole formed in a folded portion of the concave fold in the airbag cushion, and a temporary fixing structure comprising a thread circularly sewn around the circular vent hole.

2. The seat cushion airbag of claim 1, wherein the concave fold comprises one end of the airbag cushion being pushed inward toward an opposite end.

3. The seat cushion airbag of claim 1, wherein the concave fold comprises a rear portion of the airbag cushion being displaced toward a front portion of the airbag cushion.

4. The seat cushion airbag of claim 1, wherein the inflator is located at a front portion of the airbag cushion toward the knees of the passenger when the passenger is seated.

5. The seat cushion airbag of claim 1, wherein a portion of the airbag cushion overlapping around the vent hole is temporarily fixed by the temporary fixing structure such that a portion of the temporary fixing structure breaks off when the airbag cushion deploys.

6. The seat cushion airbag of claim 1, wherein:
    a plate-shaped seat panel is provided in the seat cushion, and the vent hole is formed in the airbag cushion in contact with the seat panel when the cushion airbag is deployed.

7. The seat cushion airbag of claim 1, wherein the inflator is disposed in a front portion of the airbag cushion in a direction of knees of a passenger.

8. A seat cushion airbag configured to reside in a seat cushion and, upon an automobile accident, to expand vertically to raise thighs of a seated passenger to prevent a submarine phenomenon in which the passenger slips under a lap belt, the seat cushion airbag comprising:
    an airbag cushion configured to receive pressurized gas and expand in volume in response to an automobile accident;
    an inflator to admit the pressurized gas into the airbag cushion; and
    a concave fold in the airbag cushion in which a side portion of the airbag cushion is displaced toward an interior of the airbag cushion such that two exterior portions of the airbag cushion overlap with and oppose each other across the fold,
    wherein, upon receipt of the pressurized gas, the fold is unfolded as a height of the airbag cushion expands to lift thighs of the passenger; and
    wherein the concave fold comprises a portion of the airbag cushion which is folded to overlap and which is temporarily fixed by a temporary fixing structure such that the temporary fixing structure breaks off when the airbag cushion deploys;
    wherein the temporary fixing structure extends between overlapping portions of the concave fold.

9. The seat cushion airbag of claim 8, wherein the temporary fixing structure comprises thread.

10. The seat cushion airbag of claim 8, further comprising a circular vent hole formed in a folded portion of the concave fold in the airbag cushion, wherein the temporary fixing structure comprises a thread circularly sewn around the circular vent hole.

11. A seat cushion airbag configured to reside in a seat cushion and, upon an automobile accident, to expand vertically to raise thighs of a seated passenger to prevent a submarine phenomenon in which the passenger slips under a lap belt, the seat cushion airbag comprising:
    an airbag cushion configured to receive pressurized gas and expand in volume in response to an automobile accident;
    an inflator to admit the pressurized gas into the airbag cushion; and
    a concave fold in the airbag cushion in which a side portion of the airbag cushion is displaced toward an interior of the airbag cushion such that two exterior portions of the airbag cushion overlap with and oppose each other across the fold, wherein, upon receipt of the pressurized gas, the fold is unfolded as a height of the airbag cushion expands to lift thighs of the passenger;

wherein a vent hole is formed in a folded portion of the concave fold in the airbag cushion; and wherein a plate-shaped seat panel is provided in the seat cushion, and the vent hole is formed in the airbag cushion in contact with the seat panel when the cushion airbag is deployed.

12. A seat cushion airbag configured to reside in a seat cushion and, upon an automobile accident, to expand vertically to raise thighs of a seated passenger to prevent a submarine phenomenon in which the passenger slips under a lap belt, the seat cushion airbag comprising:

an airbag cushion configured to receive pressurized gas and expand in volume in response to an automobile accident;

an inflator to admit the pressurized gas into the airbag cushion; and a concave fold in the airbag cushion in which a side portion of the airbag cushion is displaced toward an interior of the airbag cushion such that two exterior portions of the airbag cushion overlap with and oppose each other across the fold, wherein, upon receipt of the pressurized gas, the fold is unfolded as a height of the airbag cushion expands to lift thighs of the passenger; and wherein the concave fold comprises a portion of the airbag cushion which is folded to overlap and which is temporarily fixed by a temporary fixing structure such that the temporary fixing structure breaks off when the airbag cushion deploys; and further comprising:

a vent hole formed in a folded portion of the concave fold in the airbag cushion; and a plate-shaped seat panel is provided in the seat cushion, and the vent hole is formed in the airbag cushion in contact with the seat panel when the cushion airbag is deployed.

* * * * *